United States Patent
Shum

(10) Patent No.: US 7,564,651 B2
(45) Date of Patent: Jul. 21, 2009

(54) INTEGRATED-LEAD SUSPENSION VIBRATION-CANCELING MEMBER

(75) Inventor: Wing Chun Shum, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 828 days.

(21) Appl. No.: 11/106,834

(22) Filed: Apr. 14, 2005

(65) Prior Publication Data

US 2006/0232889 A1    Oct. 19, 2006

(51) Int. Cl.
*G11B 5/48*    (2006.01)
(52) U.S. Cl. .................................. 360/244.5
(58) Field of Classification Search ............... 360/244.5
See application file for complete search history.

(56) References Cited

U.S. PATENT DOCUMENTS

| | | | |
|---|---|---|---|
| 5,027,239 A * | 6/1991 | Hagen | 360/244.2 |
| 5,459,921 A | 10/1995 | Hudson et al. | |
| 5,854,721 A | 12/1998 | Lim | |
| 5,870,254 A | 2/1999 | Baserman et al. | |
| 5,905,608 A | 5/1999 | Frees et al. | |
| 5,995,327 A | 11/1999 | Hanada et al. | |
| 6,233,120 B1 | 5/2001 | Hanada et al. | |
| 6,417,995 B1 * | 7/2002 | Wu et al. | 360/245 |
| 6,532,137 B2 | 3/2003 | Huang et al. | |
| 6,538,853 B1 | 3/2003 | Williams et al. | |
| 2002/0003681 A1 | 1/2002 | Takegawa | |
| 2003/0107844 A1 * | 6/2003 | Okamoto et al. | 360/245.2 |
| 2003/0179491 A1 | 9/2003 | Yoo | |
| 2004/0095672 A1 | 5/2004 | Price | |

FOREIGN PATENT DOCUMENTS

| | | |
|---|---|---|
| JP | 4040674 | 2/1992 |
| JP | 8102162 | 4/1996 |

* cited by examiner

*Primary Examiner*—David D Davis
(74) *Attorney, Agent, or Firm*—Kunzler & McKenzie

(57) ABSTRACT

An apparatus, system, and method are disclosed for compensating for high-gain vibration modes resulting from asymmetrical traces in integrated lead suspensions in hard disk drives. A compensation member secures to an actuated arm opposite a mount plate securing a head gimbal assembly (HGA) to the arm. The compensation member includes an elastic portion primarily mirroring the elastic properties of asymmetrical elastic properties of conductive traces extending along the HGA and arm. The elastic portion secures to an inertial portion primarily mirroring inertial properties, such as center of mass and moment of inertia, of the HGA. The elastic portion may be formed as a strip of material attached at its end points to the inertial portion. The inertial portion may be formed as a flat plate secured to the actuated arm in a manner similar to the mount plate.

26 Claims, 7 Drawing Sheets

INTEGRATED-LEAD SUSPENSION VIBRATION-CANCELING MEMBER

BACKGROUND OF THE INVENTION

1. Field of the Invention

This invention relates generally to a means and method for reducing vibration in hard-disk drives and more particularly to apparatus, systems, and methods for reducing off-track vibration in disk drives having asymmetrical integrated lead suspensions.

2. Description of the Related Art

A typical hard-disk drive will include a stack of disks or "platters" mounted on a common spindle. The surfaces of the disks are typically coated with a material that is readily magnetized and demagnetized. A number of read/write heads may be positioned over the disks as the disks are spun to magnetize portions of the disks to write information thereon or detect the magnetized portions to read information therefrom. A plurality of read/write heads may be used to simultaneously read information from multiple rigid platters that are typically arranged in a vertical stack and rotated as a unit via the spindle.

Information may be stored in concentric circles or tracks on the surface of the disks. Thus, to access information stored on the hard drive, the read/write head must first be moved radially to the correct track where the information is stored. The greater the number of tracks, the greater the amount of data that may be stored on the hard-disk drive. However, increasing the density of the tracks decreases the distance between tracks. Therefore, in order to accommodate greater track densities it is important that a read/write head be positioned as accurately as possible in order to read data from, or write data to, the correct track. Aberrant motion caused by vibrations and other effects may interfere with precise positioning and must therefore be avoided.

The read/write heads are typically moved from one track to another by an actuator that is capable of very precise movements. A suspension may be interposed between the read/write heads and the actuator in order to provide a degree of flexibility, enabling the read/write heads to "float" on the surface of the disk on a very thin layer of air, or "air bearing," as the disks spin at a very high speed relative to the read/write heads. The combination of suspension and read/write head is often referred to as the head-gimbal assembly (HGA).

The suspension may include a load beam, a mount plate, a hinge plate and a flexure. The suspension secures to an arm through the mount plate, or another similar member. The arm is typically rotated by a voice coil, or other actuating mechanism. The hinge plate secures to the mount plate and flexibly secures the load beam and flexure to the arm. The load beam is typically substantially rigid and extends a substantial distance over the disks. The vertical flexibility and gram load of a suspension are provided by the hinge plate. The flexure is typically flexible in the pitch and roll directions and together with the gram load of the hinge plate is primarily responsible for enabling flotation of the read/write heads.

Electrically conductive traces extend from the read/write head and along the flexure, mount plate, and load beam, in order to transport electrical signals from the read/write head to and from drive electronics. The drive electronics interpret signals from the read/write head in order to retrieve data or send the appropriate signals to the read/write head causing it to write information to the disks. In some hard-disk drive suspensions, the traces are integrated with the suspension in order to provide ease of manufacture and high data rate capability. Such suspensions are referred to as integrated lead suspensions (ILS).

A typical ILS has traces routed from the read/write head symmetrically along the centerline of the suspension until just ahead of the hinge plate. At this location the traces typically make a 90 degree turn and go along the lateral side of the load beam, hinge plate, and mount plate. This asymmetric routing of the traces on one side of the suspension can create off track motion of the read/write head at certain frequencies and conditions.

In a typical hard disk drive a read/write head and flexure is provided for each data-bearing surface of each disk. The suspensions are swaged onto arms which interleave with the platter stack creating a "comb" shaped structure. Arms corresponding to disks in the middle of the stack may have two suspension and read/write head assemblies secured thereto in order to read from the disks above and below. However, the arm corresponding to the uppermost and lowermost disk typically include only a single suspension and read/write head either because the top surface of the uppermost disk and the bottom surface of the lowermost disk are usually not used to store data or because there is no other disk below or above the uppermost and lowermost disks providing a data-bearing surface requiring a read/write head.

Experiments conducted by the inventor indicate that the asymmetric routing of the traces on integrated lead suspensions typically does not cause deleterious vibration of the HGAs corresponding to the middle disks, inasmuch as each arm has two suspensions and read/write head assemblies secured thereto, which are typically mirror images of one another. Experiments conducted by the inventor indicate that although the HGAs of the middle disks do have vibration modes caused by the asymmetrical traces, the vibration modes are out of phase with one another and cancel each other out. As previously stated, the uppermost and lowermost arms each have a single suspension and read/write head assembly secured thereto. Experiments conducted by the inventor indicate that for the uppermost and lowermost arms the harmful vibration modes are not cancelled out and high magnitude off-track vibrations can occur.

Prior attempts to correct vibration in outer HGAs have used dummy members mirroring only the inertial properties of the flexure and read/write head assembly. None have provided a means for compensating for the dynamic interaction of the traces with the other components of the HGA.

In view of the foregoing, it is apparent that a need exists for an apparatus, method, and system for compensating for off-track vibration modes caused by asymmetric routing of traces in integrated lead suspension (ILS) head-gimbal assemblies (HGAs). Such an apparatus should be easily manufacturable. To that end, it would be an improvement in the art to provide an apparatus that is a single member easily securable to an actuator arm.

SUMMARY OF THE INVENTION

The present invention has been developed in response to the present state of the art, and in particular, in response to the problems and needs in the art that have not yet been fully solved by currently available hard-disk drives. Accordingly, the present invention has been developed to provide an apparatus, system, and method for reducing vibrations causing off-track motion of read/write heads in hard-disk drives having asymmetrically routed integrated lead suspensions.

The apparatus will typically be used in a storage system wherein information is stored on a number of rotating disks.

A read/write head may be suspended over each disk in close proximity thereto and write information to or reads information from the disk. The read/write head may be mounted on a suspension extending between the disks. A suspension may mount to a stiff arm rotated by an actuator in order to selectively position the read/write head.

An asymmetrical conduction path carries signals to and from the read/write head. The conduction path may be asymmetrical with respect to the suspension. The asymmetrical configuration may include routing of the conduction path along one lateral side of portions of the suspension and arm. A compensation member may secure to the actuator arm and compensate for off-track vibrations caused by the asymmetrical conduction path.

The compensation member includes, in one embodiment, an elastic member compensating for elastic properties, such as bending modes or spring constants in shear or tension, of the asymmetrical conduction path. The elastic member may mirror the asymmetry of the asymmetrical conduction path. For example, the elastic portion may be positioned on the same lateral side as asymmetric portions of the asymmetrical conduction path.

In one embodiment, the elastic portion is a strip of material extending longitudinally along the side of the compensation member. The strip may be attached at its endpoints and define a void between itself and the remainder of the compensation member.

The compensation member may include an inertial portion primarily configured to mirror the inertial properties of the suspension and read/write head. The inertial portion may include a universal portion securing to the arm by a means substantially similar to that of the mount plate, such as swaging. The means of attachment can also be epoxy bonding, welding or other practical means of securement. The inertial portion may include a custom portion readily altered in the design phase to cause the inertial properties of the inertial portion to match different suspensions. In one embodiment, the custom portion is a tab extending longitudinally from the compensation portion.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Figure 1:
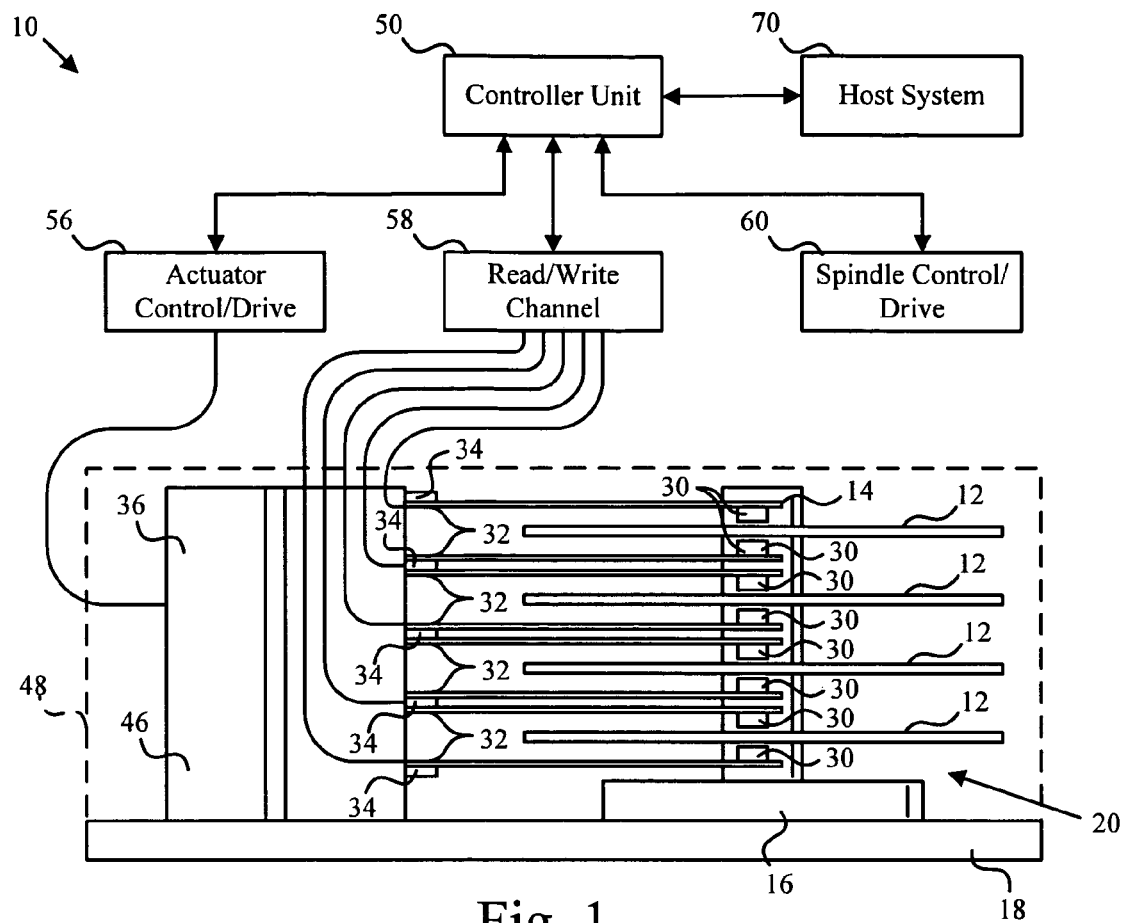
FIG. 1 is a schematic representation of one embodiment of a data storage system in accordance with the present invention.
Figure 2:
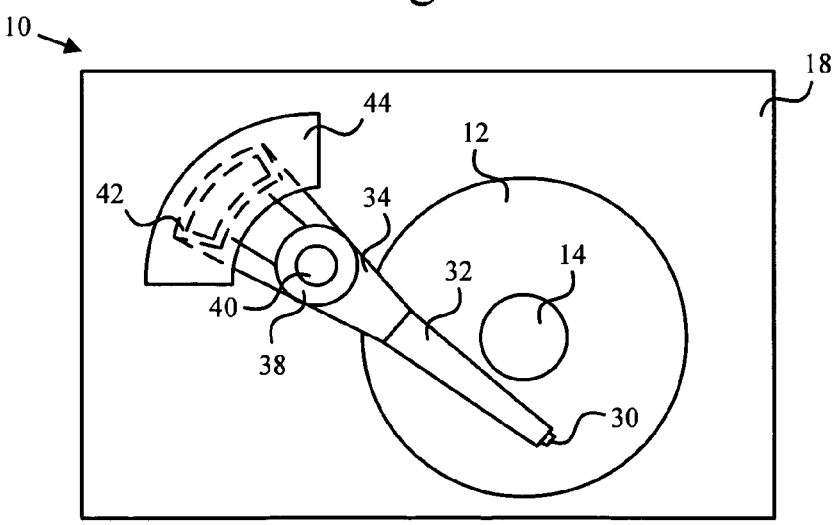
FIG. 2 is a top view illustration of the system of FIG. 1.

FIGS. 1 and 2 show schematic diagrams of one embodiment of a data storage system in which the present invention may be deployed, which is designated by the general reference number 10. The system 10 may include a plurality of magnetic recording disks 12. Each disk 12 may have a plurality of concentric data tracks. The disks 12 are typically mounted on a spindle motor shaft 14, which may connect to a spindle motor 16. The motor 16 is typically mounted to a chassis 18. The disks 12, spindle 14, and motor 16 form a disk stack assembly 20.

A plurality of read/write heads 30 may be positioned over the disks 12 such that at least one surface of each disk 12 has a corresponding head 30. Each head 30 may attach to one of a plurality of suspensions 32. Each suspension 32 may have a corresponding actuator arm 34. Suspensions 32 are typically connected to a rotary actuator 36. The actuator 36 moves the heads in a radial direction across disks 12. The actuator 36 typically includes a rotating member 38 mounted to a rotating bearing 40, a motor winding 42, and motor magnets 44. The actuator 36 is also mounted to chassis 18. The heads 30, suspension 32 and actuator 36 form an actuator assembly 46. The disk stack assembly 20 and the actuator assembly 46 may be sealed in an enclosure 48 (shown by a dashed line), which provides protection from particulate contamination.

A controller unit 50 typically provides overall control to the system 10. The controller unit 50 may contain a central processing unit (CPU), memory unit and other digital circuitry. The controller 50 may connect to an actuator control/drive unit 56 which in turn is connected to the actuator 36. This allows the controller 50 to control the movement of the heads 30 over the disks 12. The controller 50 may be connected to a read/write channel 58 which in turn connects to the heads 30. This enables the controller 50 to send and receive data from the disks 12. The controller 50 may connect to a spindle control/drive unit 60 which in turn is connected to spindle motor 16. This enables the controller 50 to control the rotation of the disks 12. A host system 70, which is typically a computer system, may connect to the controller unit 50. The system 70 may send digital data to controller 50 to be stored on disks 12, or may request the digital data be read from disks 12 and sent to the system 70. The basic operation of DASD units is well known in the art and is described in more detail in "Magnetic Recording Handbook", C. Dennis Mee and Eric D. Daniel, McGraw Hill Book Company, 1990.

Figure 3:
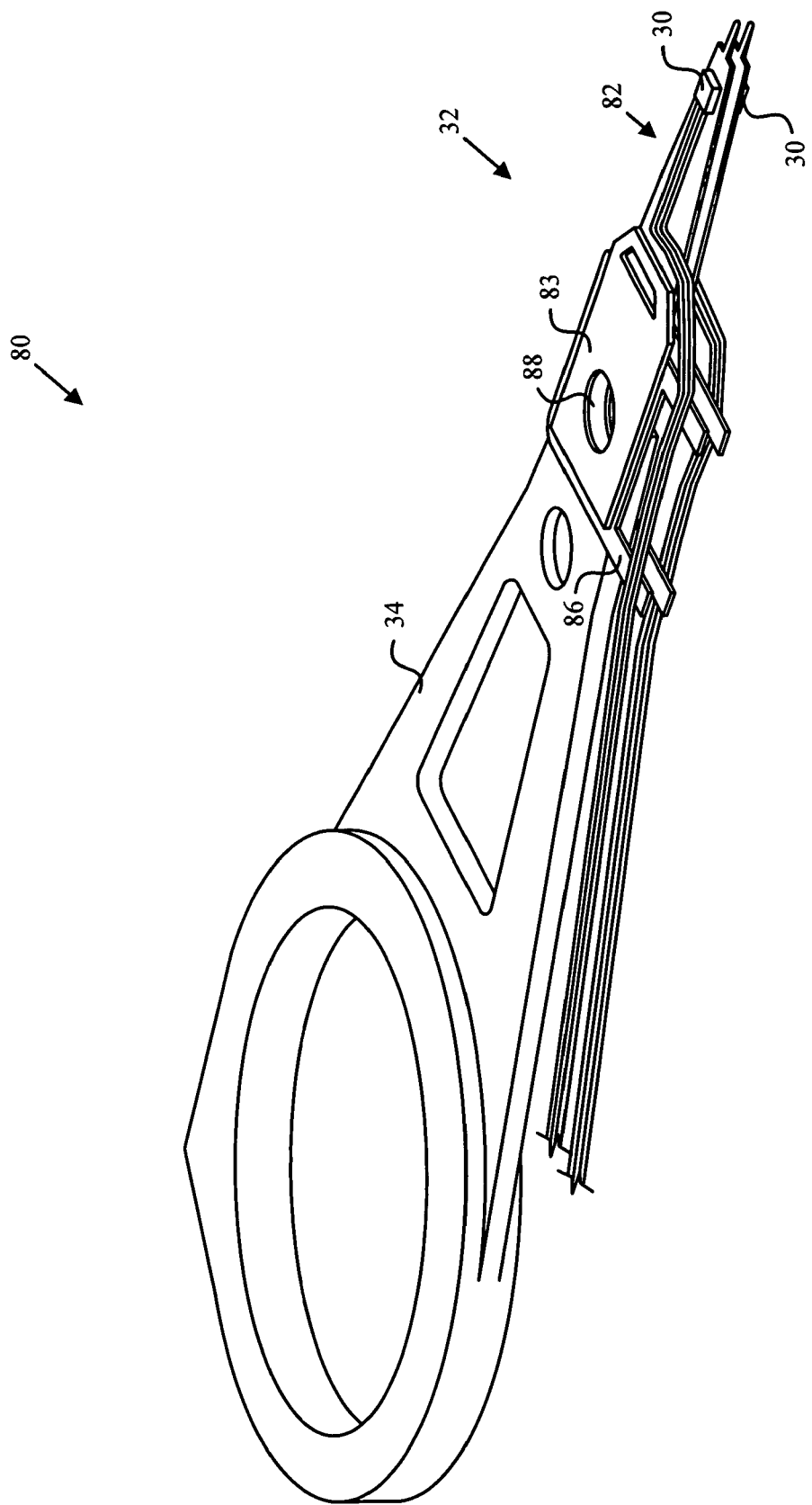
FIG. 3 is a perspective view illustration of an embodiment of a head gimbal assembly (HGA) and arm in accordance with the present invention.
Figure 4:
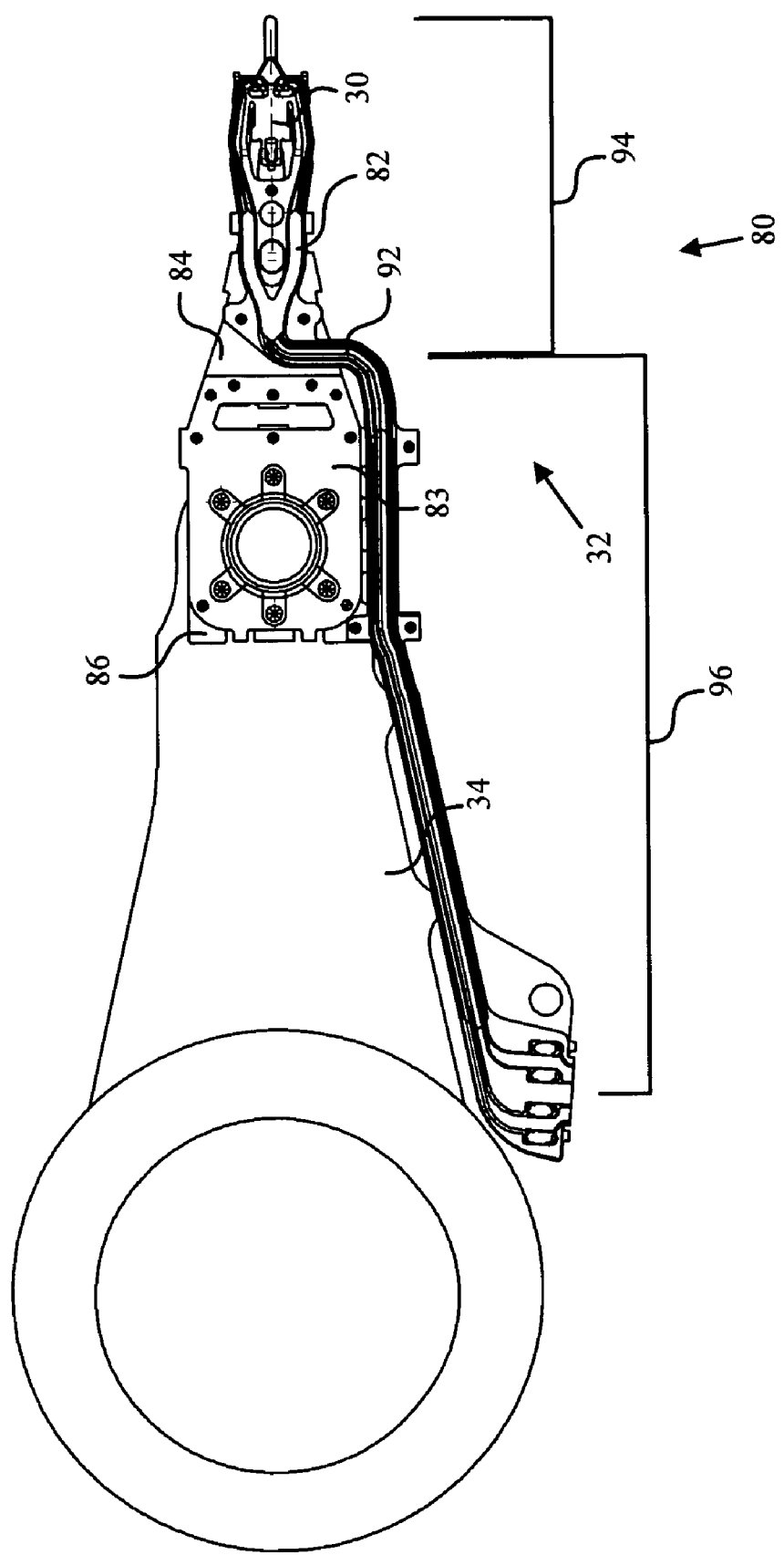
FIG. 4 is a top view of one embodiment of an HGA and arm, in accordance with the present invention.

Referring to FIGS. 3 and 4, the depicted combination of a head 30 and suspension 32 form a head gimbal assembly (HGA) 80. In some embodiments, the head 30 mounts to the suspension 32 by means of a flexure 82. The flexure 82 may be substantially flexible and provide for gimbaled mounting of the head 30 to the suspension 32. Notwithstanding the need for flexibility, it may be unnecessary, or impracticable, to have a flexure 82 spanning the entire distance from the head 30 to the actuator 36 (See FIG. 2). Accordingly, an arm 34 may extend from the actuator 36 and connect to the flexure 82. In some embodiments, a mount plate 86 secures the HGA 80 to the arm 34. A hinge plate 83 may secure to the mount plate 86 and the flexure 82 and provide for substantially hinged securement of the flexure 82 to the plate 86. In some embodiments a load beam 84 may secure to the hinge plate 83 and provide a support for the flexure 82. The mount plate 86 may secure to the arm 34 by a variety of means. In the illustrated embodiment, a swage hole 88 is provided in the mount plate to facilitate swaging of the mount plate 86 to the arm 34.

Arms 34 corresponding to disks 12 in the middle of the disk stack assembly 20 may have two HGAs 80 secured thereto (hereinafter a "dual head arm 34"), with the heads 30 positioned between disks 12 during operation. Some embodiments may include two arms 34 each having a single flexure 82 and head 30 assembly secured thereto. The two arms 84 may secure to the actuator 36 by means of stacking. The arms 34 corresponding to the outermost disks 12 may include a single HGA 80 (hereinafter a "single head arm 34"), inasmuch as there is not additional surface above or below the uppermost and lowermost disks, respectively, that requires an additional HGA 80.

Traces 92, also referred to as electrical lines 92 or leads 92, may carry electrical signals from the head 30. Traces 92 may be made of a highly conductive metal such as copper or gold. The traces 92 may be asymmetric with respect to the HGA 80. In the illustrated embodiment, the trace 92 includes both a symmetric portion 94 and an asymmetric portion 96. The symmetric portion 94 may extend down the center of the flexure 82 to a position proximate the hinge plate 83. The asymmetric portion 96 may then extend along the lateral side of the mount plate 86 and arm 34. Each head 30 has a corresponding set of traces 92. Accordingly, a dual head arm 34 will have two sets of traces 92 for two HGAs 80 mounted on both the top and bottom of the arm 34, which will each be substantially the mirror images of each other.

Figure 5:
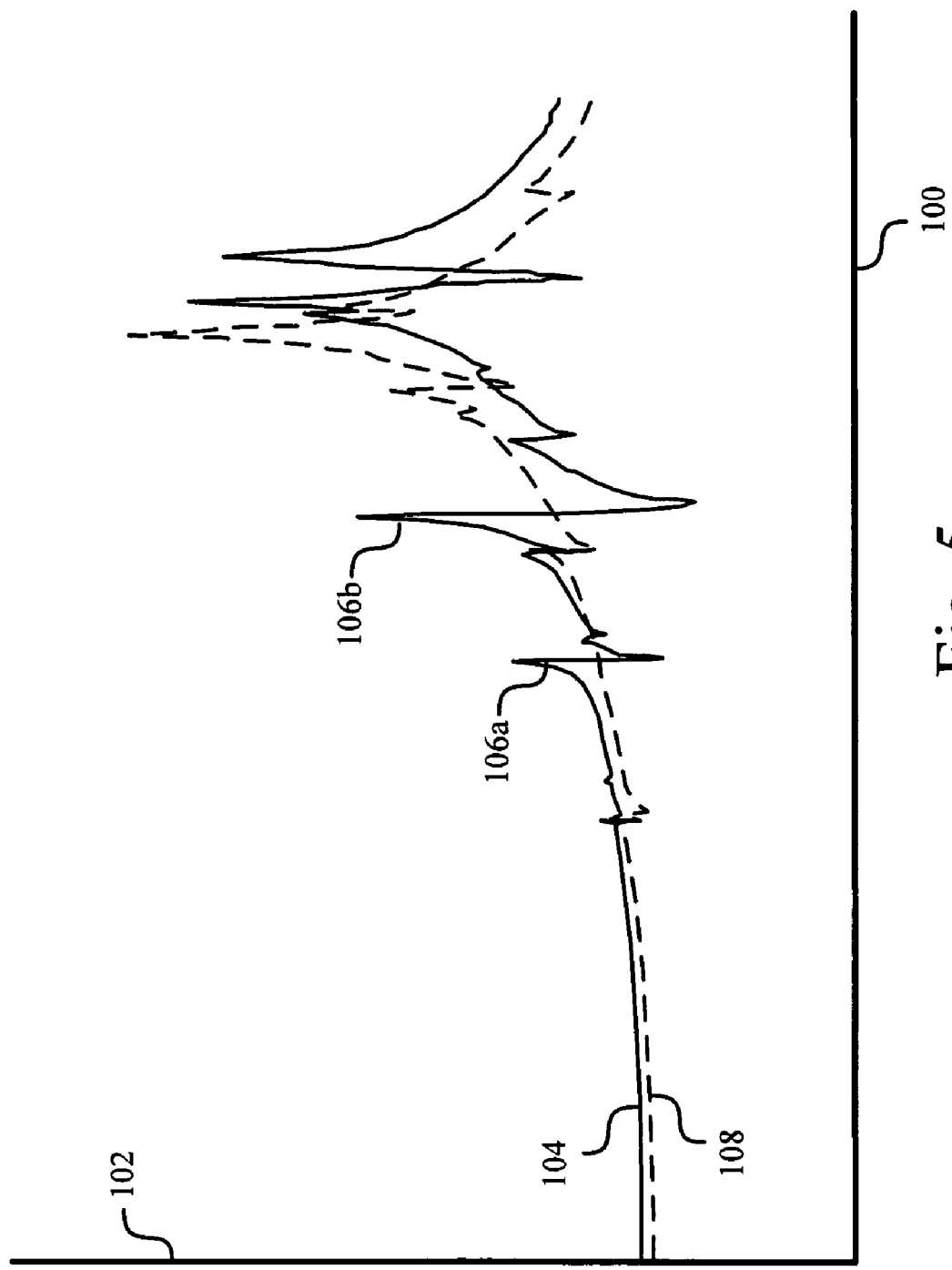
FIG. 5 is a frequency response plot representative of single and dual HGA arms.

FIG. 5 is a frequency-response plot of a dual head arm 34 and a single head arm 34 with the horizontal axis 100 representing frequency and the vertical axis 102 representing the magnitude of the response of the HGA 80. It is clear that plot 104, corresponding to a single head arm 34 has high-magnitude resonance peaks 106a and 106b in lower frequency ranges. In the illustrated embodiment, the peaks 106a and 106b occur respectively at approximately 11 kHz and 14 kHz. It will also be observed, that the peaks 106a and 106b do not occur in plot 108 corresponding to a dual head arm 34.

Experiments conducted by the inventor have shown that the peaks 106a and 106b correspond to bending modes in the suspension 32 that are coupled with the bending modes of the arm 34. Inasmuch as the traces 92 secure to both the suspension 32 and the arm 34, the traces 92 affect the coupled bending modes. In particular, because the traces 92 extend along the lateral side of the arm 34, the traces 92 create a lateral pull on the arm 34, which corresponds to off-track motion of the read/write head 30. The lateral pull of the traces 92 may be present in both single head arms 34 and dual head arms 34. However, the absence of the peaks 106a, 106b in the plot 108 corresponding to a dual head arm 34 indicates that the problematic modes are out of phase with one another and cancel one another out.

Figure 6:
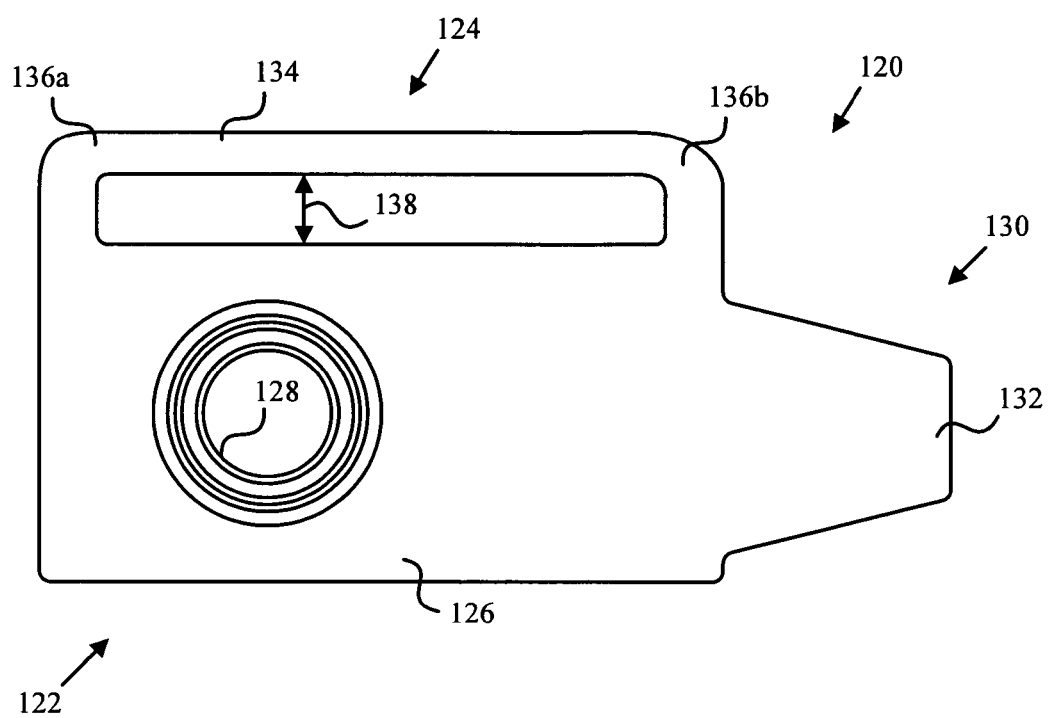
FIG. 6 is a top view illustration of a compensation member, in accordance with the present invention.
Figure 7:
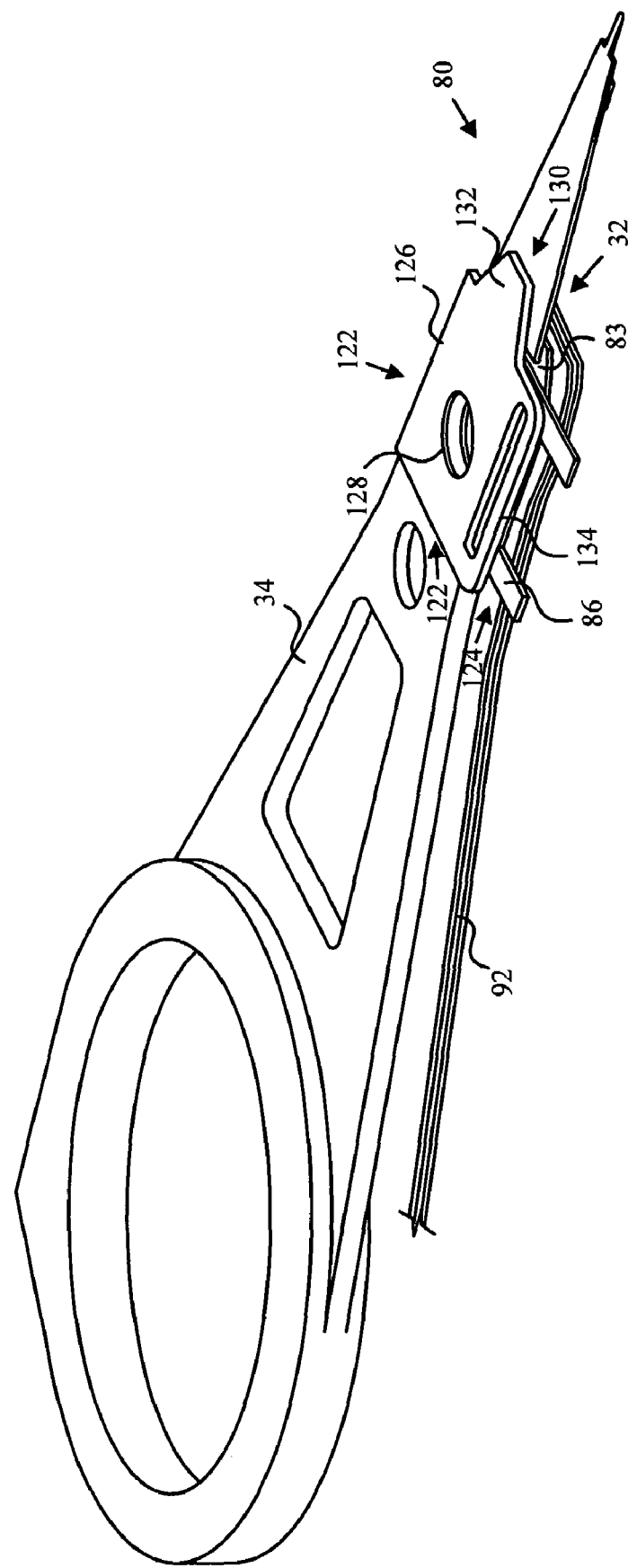
FIG. 7, is a perspective view illustration of a combined compensation member and HGA, in accordance with the present invention.

Referring to FIGS. 6 and 7, a compensation member 120 may be secured to a single head arm 34 in order to cancel the problematic high-gain modes. The compensation member 120 may include an inertial portion 122 and an elastic portion 124, or trace portion 124. The inertial portion 122 may substantially mirror one or more inertial properties of the HGA 80, such as mass, center of mass, and moment of inertia about one or more axes. The elastic portion 124 may substantially mirror the bending modes of the traces 92, in particular the asymmetric lateral pull of the traces 92. Although the elastic portion 124 primarily compensates for the bending modes of the traces 92, it nevertheless has mass and the inertial properties that, when combined with the inertial properties of the inertial portion 122, may mirror the inertial properties of the HGA 80.

Depending on the application, the compensation member 120 may compensate for one or both of inertial properties of an HGA 80. For example, in some embodiments, only the elastic properties of the elastic portion 124 will mirror the asymmetric elastic properties of the traces 92 whereas the inertial portion 122 does not substantially mirror inertial properties of the HGA 80.

The compensation member 120 may secure to the arm 34 in a position corresponding to the mount plate 86. That is, the same position that the mount plate 86 would have occupied in a dual head arm 34. In some embodiments, the compensation member 120 may have a universal portion 126 having a configuration to facilitate securement to the arm 34 in the same manner as the mount plate 86. A universal portion 126 may facilitate the use of the same arm 34 and the same assembly methods and machines for both the compensation member 120 and the mount plate 86. In some embodiments, the universal portion 126 may include a swage hole 128, and like structures, to facilitate swaged securement to the arm 34 in a manner similar to the mount plate 86.

Certain embodiments of the inertial portion 122 may include a custom portion 130 to facilitate design of a compensation member 120 for a particular HGA 80. In the illustrated embodiment, the custom portion 130 is embodied as a tab 132. The tab 132 may be adjusted in size without requiring a change in the universal portion 126 of the compensation member 120.

An elastic portion 124 may be embodied as a strip 134 extending longitudinally along a lateral side of the compensation member 120 corresponding to the lateral side of the load beam 84 along which the trace 92 extends. The thickness, width, and length of the strip may be selected to match the elastic effect of the trace 92. The strip 134 may be secured at its end points 136a, 136b to the compensation member 120. The strip 134 may be spaced apart from the compensation member 120 by a distance 138. Separation from the compensation member 120 may facilitate independent stretching and bending of the elastic portion 124 in order to mimic the independent elastic properties of the traces 92 with respect to the HGA 80 and arm 34.

The elastic portion 124 has mass, and as such contributes to the inertial properties of the compensation member 120. Furthermore, the inertial portion 122 has elastic properties and therefore contributes to the elastic properties of the compensation member 120. Nevertheless, the elastic portion 124 primarily mirrors the elastic and mass properties of the traces 92, whereas the inertial portion 122 primarily mirrors the inertial properties of the HGA 80.

In the illustrated embodiment the inertial portion 122 and elastic portion 124 are formed monolithically. In some embodiments, the inertial portion 122 and elastic portion 124 may be formed from a thin plate of uniform thickness. Alternatively, the inertial portion 122 and elastic portion 124 may be separate members made of the same or different materials and secured to one another by means of solder, glue, welds, or like securement means. Use of different materials may enable more refined mirroring of the properties of the suspension 32 and traces 92.

Although the depicted suspension 32 includes a mount plate 86, flexure 82, hinge plate 83, and load beam 84, various other configurations are possible. Accordingly, a compensation member 120 may include an inertial portion 122 and elastic portion 124 corresponding to the inertial and asymmetric elastic properties of these alternative configurations. The strip 134 likewise may have different widths, thicknesses, and lengths to correspond to different configurations of traces 92.

Figure 8:
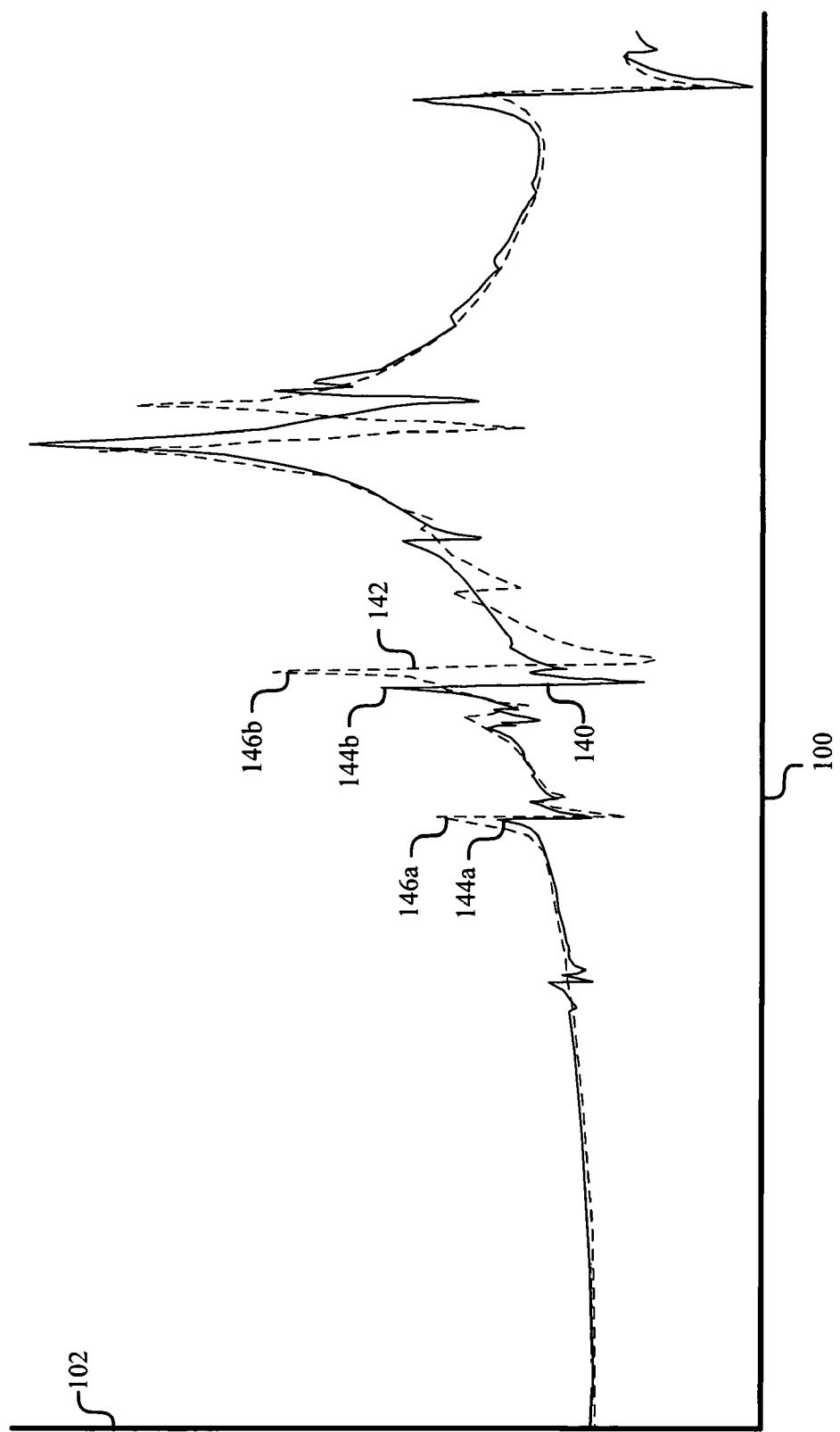
FIG. 8, is a frequency response plot representative of single HGA arms both with and without a compensation member.

FIG. 8 is a frequency response plot 140 of a single head arm 34 having a compensation member 120 secured to the top of arm 34 and a frequency plot 142 of a single head arm 34 without a compensation member 120. It is clear that the compensation member 120 reduces the magnitude of the peaks 144a and 144b as compared to the peaks 146a and 146b of the uncompensated single head arm 34. Accordingly, off-track motion attributable to asymmetric vibration is reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for reducing vibrations in a storage device, the apparatus comprising:
   a rotational medium configured to bear perceivable information;
   an actuator arm;
   a suspension secured to a distal end of the actuator arm;
   a read/write head secured to a distal end of the suspension, the actuator arm configured to selectively position the read/write head over the rotational medium;
   an asymmetrical conduction path for bearing signals away from the read/write head, the asymmetrical conduction path connected to the read write head and extending from the head toward a proximal end of the actuator arm, the asymmetrical conduction path being asymmetrical with respect to the actuator arm, wherein a portion of the conduction path is disposed adjacent to a lateral side of the actuator arm; and
   a compensation member secured to the actuator arm, the compensation member comprising an elastic portion sized and positioned to compensate for at least one elastic attribute of the asymmetrical conduction path, the elastic portion extending longitudinally along a lateral side of the compensation member, the elastic portion positioned opposite the portion of the asymmetrical conduction path, the elastic portion having an elasticity that causes the elastic portion to dampen a vibration in the portion of the asymmetrical conduction path.

2. The apparatus of claim 1, wherein the compensation member further comprises an inertial portion sized and positioned to compensate for at least one inertial attribute of the suspension.

3. The apparatus of claim 2, wherein the compensation member defines a void positioned between the inertial portion and the elastic portion.

4. The apparatus of claim 1, wherein the elastic portion comprises an elongate strip.

5. The apparatus of claim 4, wherein the elongate strip is formed monolithically with the inertial portion.

6. The apparatus of claim 1, wherein the inertial portion comprises a tab extending longitudinally toward the read/write head.

7. The apparatus of claim 1, wherein the elastic portion is further sized and positioned to substantially mirror an elastic attribute of the asymmetrical conduction path.

8. The apparatus of claim 1, wherein the asymmetrical conduction path includes a centered portion extending longitudinally along a center line of the suspension and a lateral portion extending along a lateral side of the actuator arm.

9. The apparatus of claim 1, wherein the elastic portion is positioned on the same lateral side as the lateral portion of the asymmetrical conduction path.

10. The apparatus of claim 1, wherein the suspension comprises
   a flexure for flexibly suspending a read/write head over the disk, the read/write head secured to a distal end of the flexure;
   a load beam for providing rigid support for the flexure;
   a mount plate mounting the suspension to the actuator arm; and
   a hinge plate for providing a load force for the read/write head, the hinge plate securing the load beam and flexure to the mount plate.

11. The apparatus of claim 10, wherein the compensation member is further sized and positioned to compensate for at least one inertial attribute of at least one of the read/write head and the suspension.

12. The apparatus of claim 10, wherein the compensation member secures to the actuator arm vertically opposite the mount plate.

13. An apparatus for reducing vibrations in a storage device, the apparatus comprising:
- a rotational medium configured to bear perceivable information;
- an actuator assembly comprising:
  - an arm comprising a first securement face and a second securement face,
  - a suspension secured to the first securement face near a distal end thereof, and
  - a read/write head configured to detect the perceivable information and secured to the suspension near a distal end thereof;
- an asymmetrical conduction path for conducting electrical signals along a path extending from the read/write head to the arm, wherein a portion of the conduction path is disposed adjacent to a lateral side of the actuator arm; and
- a compensation member secured to the second securement face, the compensation member comprising:
  - an inertial portion sized and positioned to substantially mirror an inertial property of the suspension and read/write head; and
  - an elastic portion secured to the inertial portion, the elastic portion sized and positioned to substantially mirror an elastic property of the asymmetrical conduction path, the elastic portion extending longitudinally along a lateral side of the compensation member, the elastic portion positioned opposite the portion of the asymmetrical conduction path, the elastic portion having an elasticity that causes the elastic portion to dampen a vibration in the portion of the asymmetrical conduction path.

14. The apparatus of claim 13, wherein the actuator assembly further comprises a mount plate securing a distal end of the suspension to the arm.

15. The apparatus of claim 14, wherein the asymmetrical conduction path extends along a central line of the suspension and along a lateral side of the mount plate.

16. The apparatus of claim 15, wherein the elastic portion of the compensation member is positioned proximate the same lateral side of the mount plate as the asymmetrical conduction path.

17. The apparatus of claim 16, wherein the elastic portion comprises an elongate strip that is substantially parallel to a portion of the asymmetric conduction path.

18. The apparatus of claim 13, wherein the compensation member defines a void positioned between the elastic portion and the inertial portion.

19. The apparatus of claim 18, wherein the elongate strip is formed monolithically with the inertial portion.

20. The apparatus of claim 13, wherein the inertial portion further comprises:
- a universal portion secured directly to the load arm, the universal portion formed similarly to a securing portion of the mount plate;
- a custom portion sized to mirror the inertial property of the suspension and read/write head when combined with the universal portion.

21. The apparatus of claim 20, wherein the custom portion comprises a tab sized to modify an inertial property of the compensation portion to be substantially equal to the inertial property of the suspension and read/write head.

22. The apparatus of claim 20, wherein the inertial property of the suspension and read/write head is selected from the group consisting of mass, center of mass position, and moment of inertia about at least one axis.

23. An apparatus for reducing vibrations in a storage device, the apparatus comprising:
- a rotating disk configured to bear perceivable information;
- an actuator arm;
- a read/write head for detecting information on the disk
- a suspension comprising:
  - a load beam,
  - a flexure secured to the load beam and having a distal end secured to the read/write head,
  - a mount plate securing the load beam to the actuator arm, and
  - an asymmetrical conduction path extending from the read write head to the load arm, the asymmetrical conduction path having a central portion extending longitudinally along a center line of the flexure and a lateral portion extending along a lateral side of the mount plate; and
- a compensation member secured to the load arm vertically opposite the mount plate, the compensation member comprising:
  - an elastic portion positioned on the same lateral side as the lateral portion of the asymmetrical conduction path, the elastic portion mirroring an elastic property of the asymmetrical conduction path, the elastic portion extending longitudinally along a lateral side of the compensation member, the elastic portion positioned opposite the portion of the asymmetrical conduction path, the elastic portion having an elasticity that causes the elastic portion to dampen a vibration in the lateral portion of the asymmetrical conduction path, and
  - an inertial portion sized and positioned to mirror an inertial property of the suspension and read/write head.

24. The apparatus of claim 23, wherein the elastic portion comprises a strip extending longitudinally along the compensation member and spaced apart laterally from the compensation member, the strip having two end points secured to the compensation member at the endpoints thereof.

25. The apparatus of claim 24, wherein the inertial portion further comprises:
- a universal portion having a configuration substantially similar to a portion of the mount plate, the universal portion securing directly to the actuator arm;
- a custom portion sized to mirror the inertial property of the suspension and read/write head when combined with the universal portion.

26. The apparatus of claim 24, wherein the custom portion is a tab extending longitudinally from the universal portion toward the read/write head.

* * * * *